US007680502B2

(12) United States Patent
McCown et al.

(10) Patent No.: US 7,680,502 B2
(45) Date of Patent: Mar. 16, 2010

(54) RADIO FREQUENCY DETECTION ASSEMBLY AND METHOD FOR DETECTING RADIO FREQUENCIES

(76) Inventors: Steven H. McCown, 3827 E. 137 North, Rigby, ID (US) 83442; Kurt Warren Derr, 6699 Albert La., Idaho Falls, ID (US) 83401

( * ) Notice: Subject to any disclaimer, the term of this patent is extended or adjusted under 35 U.S.C. 154(b) by 647 days.

(21) Appl. No.: 11/460,662

(22) Filed: Jul. 28, 2006

(65) Prior Publication Data

US 2008/0025238 A1      Jan. 31, 2008

(51) Int. Cl.
*H04Q 7/20* (2006.01)
(52) U.S. Cl. .................. 455/457; 455/456.5; 455/456.1; 342/463; 340/993
(58) Field of Classification Search ................ 455/457, 455/456.5, 456.1, 463; 342/463; 340/993
See application file for complete search history.

(56) References Cited

U.S. PATENT DOCUMENTS

| 6,127,976 | A  | * | 10/2000 | Boyd et al. ................ 342/463 |
| 2003/0171833 | A1 | * | 9/2003 | Crystal et al. ................ 700/94 |
| 2004/0248586 | A1 | * | 12/2004 | Patel et al. ............... 455/456.1 |

* cited by examiner

*Primary Examiner*—Danh C Le
(74) *Attorney, Agent, or Firm*—Wells St. John

(57) ABSTRACT

A radio frequency detection assembly is described and which includes a radio frequency detector which detects a radio frequency emission produced by a radio frequency emitter from a given location which is remote relative to the radio frequency detector; a location assembly electrically coupled with the radio frequency detector and which is operable to estimate the location of the radio frequency emitter from the radio frequency emission which has been received; and a radio frequency transmitter electrically coupled with the radio frequency detector and the location assembly, and which transmits a radio frequency signal which reports the presence of the radio frequency emitter.

29 Claims, 3 Drawing Sheets

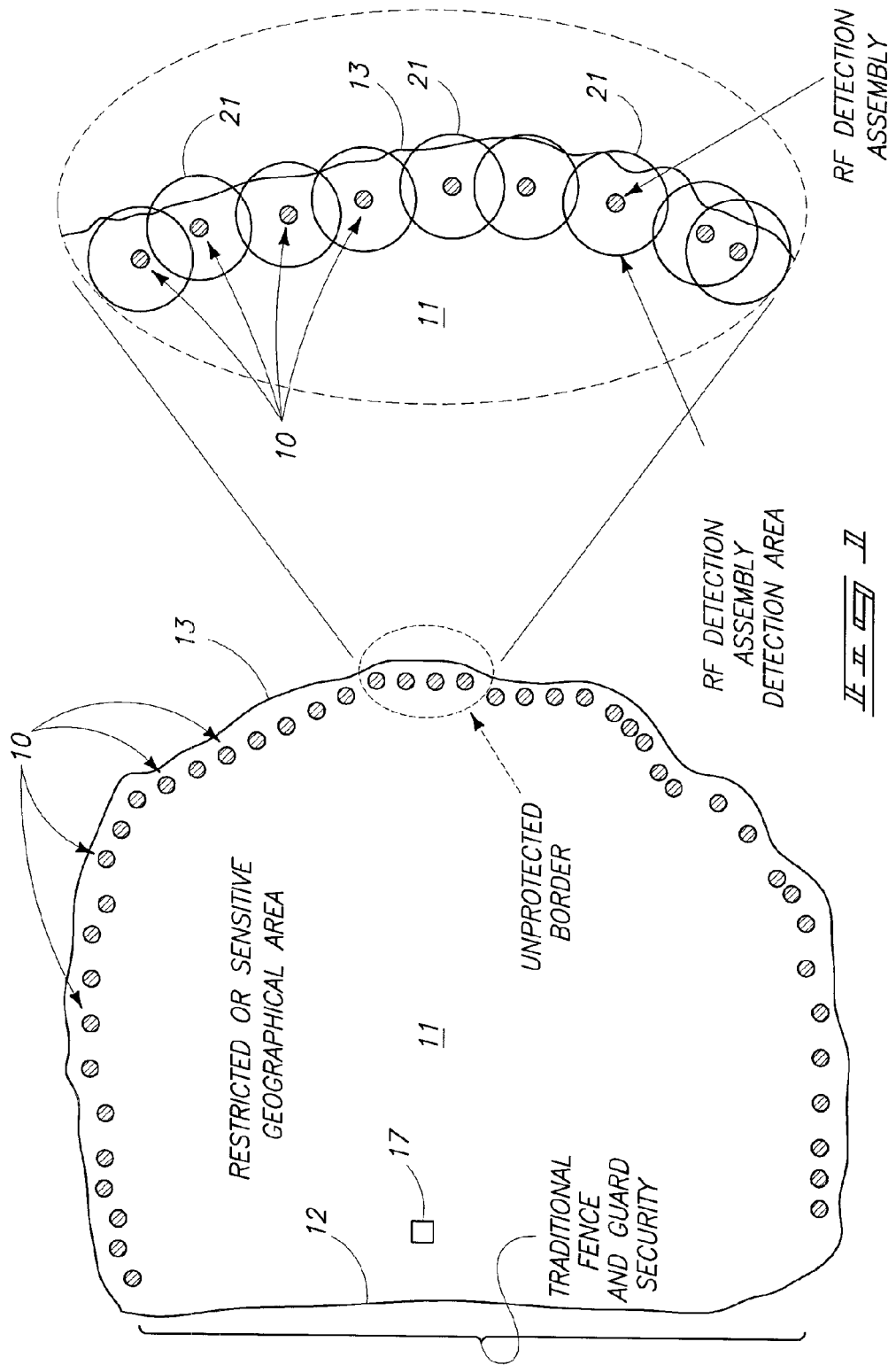

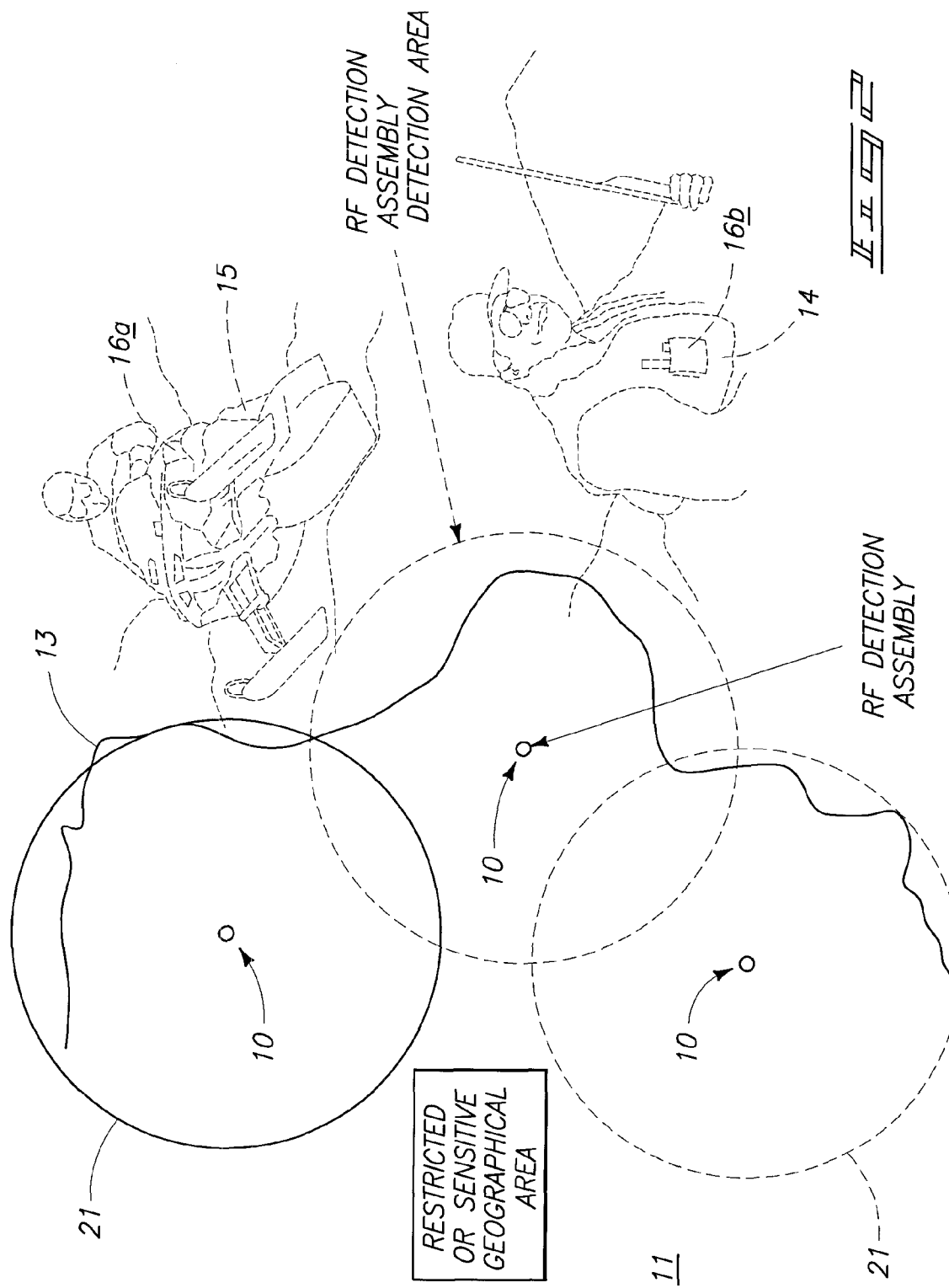

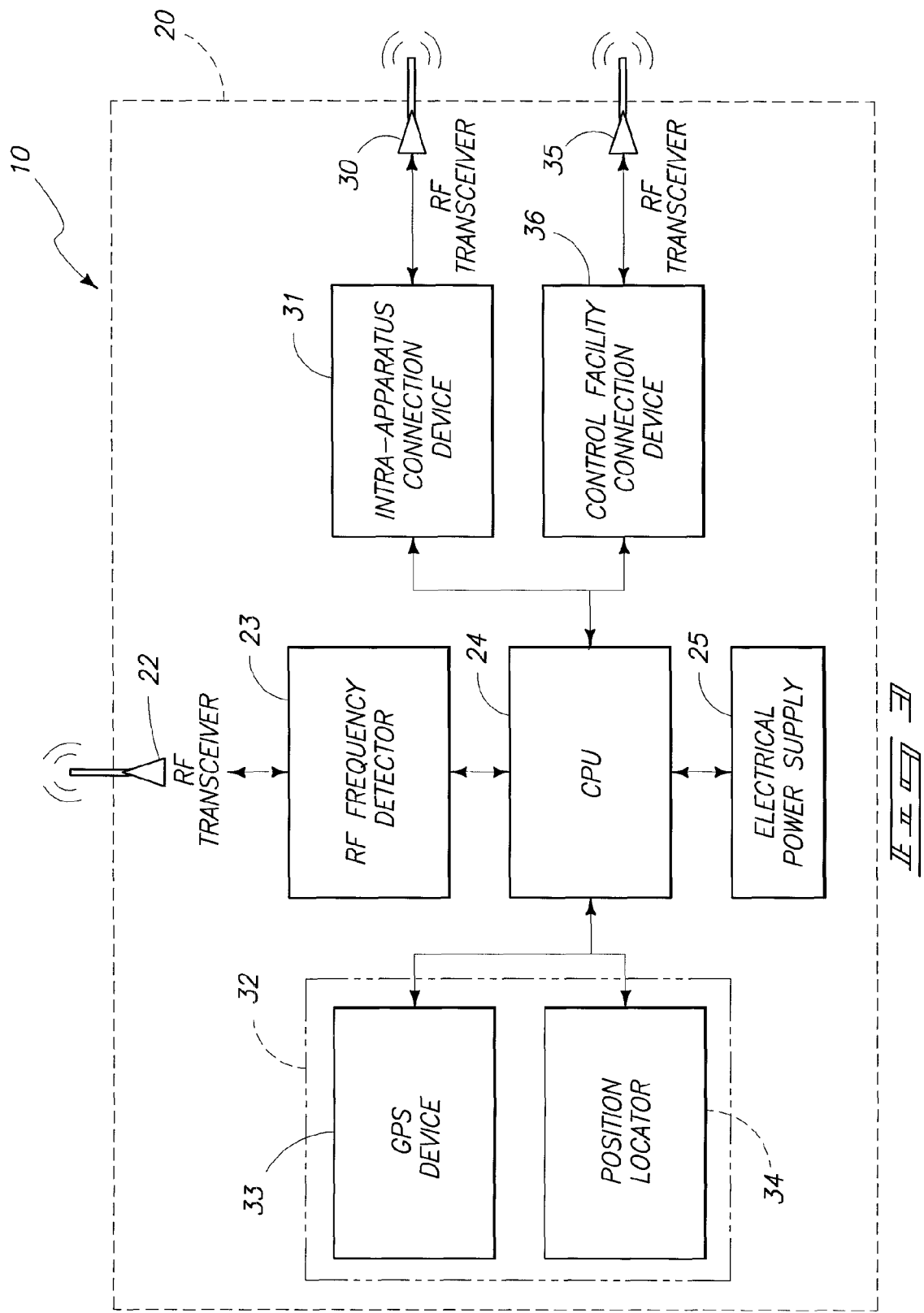

RADIO FREQUENCY DETECTION ASSEMBLY AND METHOD FOR DETECTING RADIO FREQUENCIES

GOVERNMENT RIGHTS

The United States Government has certain rights in this invention pursuant to Contract No. DE-AC07-05ID14517 between the United States Department of Energy and Battelle Energy Alliance, LLC.

TECHNICAL FIELD

The present invention relates to a radio frequency detection assembly, and method for detecting radio frequencies, and more specifically to an assembly which can be easily deployed along a boundary of a restricted geographical region, and which can identify, locate, monitor and thereafter notify an intruder or trespasser of their presence within the restricted geographical region in order to effect their departure from same.

BACKGROUND OF THE INVENTION

Many commercial and government facilities which conduct sensitive operations are often located in such large geographical areas that fencing their perimeter, and providing guards for the same geographical area is financially impractical. Still further, many of these commercial and government facilities are located in remote regions and often border on recreational areas such as national parks, national forests, and other similar areas. Heretofore, many individuals have often entered into such restricted or security-sensitive geographical areas either intentionally or by accident while engaged in various recreational pursuits. Accidental trespassers who have come into these restricted geographical regions have included hunters, recreational ATV riders, snowmobilers, hikers, and curious tourists. The entrance of these types of individuals into secure, but otherwise sensitive geographical regions can be dangerous to the trespasser, as well as compromise confidential processes being conducted in the restricted or sensitive geographical region. For example, such sensitive areas may include bombing ranges, and ordinance disposal areas which are often located within such sensitive regions.

Currently, more than 180,000,000 cellular telephones are now in use within the United States alone. Many individuals such as hunters, vacationers, and others carry cell phones when they are traveling in remote regions. Such cell phones, when placed in an on condition produce an RF signal even when the cell phone is not being used to make a call, that is, when it is sitting in an idle condition.

A radio frequency detection assembly and method for detecting radio frequencies which can detect cellular telephone radio frequency signals or other RF signals from hand held VHF or UHF radios within a sensitive area for purposes of determining the presence of a trespasser or other unauthorized individual within a restricted or otherwise sensitive geographical region is the subject matter of the present application.

SUMMARY OF THE INVENTION

A first aspect of the present invention relates to a radio frequency detection assembly which includes a radio frequency detector which detects a radio frequency emission produced by a radio frequency emitter from a given location which is remote relative to the radio frequency detector; a location assembly electrically coupled with the radio frequency detector and which is operable to estimate the location of the radio frequency emitter from the radio frequency emission which has been received; and a radio frequency transmitter electrically coupled with the radio frequency detector and the location assembly, and which transmits a radio frequency signal which reports the presence of the radio frequency emitter.

Another aspect of the present invention relates to a radio frequency detection assembly which includes a first radio frequency transceiver which detects a radio frequency emission produced by a communications device from a given restricted geographical region which is remote relative thereto; a central processing unit electrically coupled with the first radio frequency transceiver, and which controls the operation of the radio frequency detection assembly; a second radio frequency transceiver which is electrically coupled with the central processing unit and which communicates with another radio frequency detection assembly which is deployed near the given restricted geographical region; a control facility which is positioned remotely relative to the radio frequency detection assembly and which can communicate with the communications device which is located within the given restricted geographical region; a location assembly electrically coupled with the central processing unit and which estimates the location of the communications device within the given restricted geographic region from the radio frequency emission produced by the communications device; and a third radio frequency transceiver which is electrically coupled with the central processing unit and which transmits a message to the control facility to notify the control facility of the presence of the communications device within the restricted geographical region, and wherein the control facility transmits a message to the communications device to warn a user of the communications device that the user is in a restricted geographical region.

Another aspect of the present invention relates to a method for detecting radio frequencies which includes the steps of deploying a radio frequency detector in a given geographical region; detecting an emitted radio frequency produced by a communication device within the given geographical region by means of the radio frequency detector; and reporting the presence of the communication device within the geographical region to a control facility.

Still another aspect of the present invention relates to a method for detecting radio frequencies which includes the steps of deploying a radio frequency detector within a given restricted geographical region; providing a control facility which has responsibility for securing the given restricted geographical region; detecting an emitted radio frequency produced by a cellular telephone or a two-way radio within the restricted geographical region; determining the geographic location of the cellular telephone or two way radio within the restricted geographical region based, at least in part, upon the emitted radio frequency of the cellular telephone or two-way radio; reporting the geographical location of the cellular telephone or two-way radio within the restricted geographical region to the control facility; and communicating with the cellular telephone or two-way radio in a fashion so as to advise a user of the cellular telephone or two-way radio of their location within the restricted geographical region.

These and other aspects of the present invention will be described in greater detail hereinafter.

BRIEF DESCRIPTION OF THE DRAWINGS

Preferred embodiments of the invention are described below with reference to the following accompanying drawings.

FIG. 1 is a greatly simplified schematic view of a sensitive geographical area showing a boundary and the deployment of a plurality of radio frequency detection assemblies around the boundary. This view further shows a greatly enhanced portion of a boundary with the deployment of a plurality of radio frequency detectors along the boundary.

FIG. 2 is a greatly enlarged schematic view of a boundary of a protected or sensitive geographical region, and showing the deployment of a plurality of radio frequency detection assemblies along the boundary thereof.

FIG. 3 is a greatly simplified schematic view of the radio frequency detection assembly of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

FIG. 3 illustrates the radio frequency detection assembly 10 of the present invention in a schematic arrangement for ease of understanding. Referring now to FIG. 1, it will be seen that the radio frequency detection assembly 10 of the present invention is deployed to secure a restricted or sensitive geographical area which is generally indicated by the numeral 11 therein. As seen in FIG. 1, the restricted or sensitive geographical area has a boundary which includes a first portion 12 which may be secured by a traditional security fence and/or guard security force which protects the boundary from intentional or inadvertent trespassers; and a second portion 13 which may be remote relative to the first portion 12 and which is an unprotected border which may cover relatively inaccessible areas such as canyons, steep terrain, mountains, and similar terrain which would be difficult to patrol or otherwise secure with a traditional security fence, or with guard personnel who might be on foot, or in a motorized vehicle.

Referring now to FIG. 2, it should be understood that various individuals may intentionally or unintentionally trespass or otherwise cross the second portion 13 of the boundary of the restricted or sensitive geographical area 11. As seen therein, individuals who may cross the boundary may include hunters 14, or other users of the adjacent property such as snowmobilers 15, and other individuals. Such users will typically carry on their person, a cellular telephone 16a or two-way radio 16b. Still further, and referring to FIG. 1, it should be understood that the restricted or sensitive geographical area will typically include a control facility 17 which is responsible for the security of the boundary 12 and 13 of the restricted or otherwise sensitive geographical area 11.

Referring first to FIG. 1, it will be seen that the radio frequency detection assembly 10 of the present invention is deployed along the second portion 13 of the boundary of the restricted or sensitive geographical area 11 as illustrated. The respective radio frequency detection assemblies 10 are positioned in spaced relation so that their respective radio frequency detection areas 21 which are provided by these assemblies are in substantially overlapping relation such as illustrated in FIG. 2. Referring now to FIG. 3, it will be seen that the radio frequency detection assembly of the present invention includes a lightweight and weatherproof container which is generally indicated by the numeral 20, and which encloses the components which will be discussed in greater detail, hereinafter. As should be understood from the earlier discussion, the invention 10 can be deployed within a given restricted or sensitive geographical area 11 by hand; thrown from an overland vehicle; and/or dropped from an aircraft. Therefore, the present invention 10 provides a convenient method for detecting radio frequencies. The present methodology includes, as a first step, deploying a radio frequency detector, as will be described below, within a given restricted geographical region 11; and further providing a control facility 17 which has responsibility for securing the given restricted geographical region 11 and which communicates with same.

In the arrangement as seen in FIG. 3, it will be understood that the radio frequency detection assembly 10, as enclosed in the lightweight and weatherproof container 20, includes a first radio frequency transceiver 22 which detects a radio frequency emission produced by a communications device such as a cellular telephone 16a, or two-way radio 16b from a given restricted geographical region 11 which is remote relative thereto. The first radio frequency transceiver is electrically coupled or otherwise cooperates with a radio frequency detector 23, and which detects the radio frequency emission produced by a radio frequency emitter such as a cellular telephone or two-way radio 16a and 16b from a given location which is remote relative to the radio frequency detector 23. The radio frequency detection assembly 10 further includes a central processing unit, which is generally indicated by the numeral 24, and which is electrically coupled to the first radio frequency transceiver, and the radio frequency detector 22 and 23, respectively, and which controls the operation of radio frequency detection assembly 10. An example of a suitable CPU which may be useful in the present invention may be purchased from NTEL and which has the product identifier PXA263. This product is a 400 MHz. CPU. As illustrated in FIG. 3, an electrical power supply 25 is provided, and which energizes the radio frequency detection assembly 10. The electrical power supply as contemplated by the present invention may comprise any number of different assemblies such as various forms of charge storage devices, i.e. rechargeable batteries, capacitors and similar assemblies; or may further include other power generation equipment such as fuel cells, solar panels, wind generators, or other similar arrangements which may provide a continuous source of electricity which allows the present radio frequency detection assembly 10 to continually operate over prolonged periods of time.

Referring still to FIG. 3, it will be seen that the radio frequency detection assembly 10 of the present invention includes a second radio frequency transceiver 30, which is electrically coupled with the central processing unit 24, and which further communicates with another radio frequency detection assembly 10 which is adjacent thereto, or nearby, by means of an intra-apparatus connection device 31. This aspect of the invention allows several radio frequency detection assemblies 10 to locate a trespasser in the restricted or sensitive geographical area 11 by means of triangulation. Still further, as seen in FIG. 3 it will be understood that the present invention 10 includes a location assembly which is generally indicated by the numeral 32. The location assembly is used to identify the geographical location of a trespasser who is moving within the restricted or sensitive geographical area 11 by means of the radio frequency emission being provided by the trespassers' cellular telephone 16a or two-way radio 16b. In this regard, the location assembly 32 may comprise a global positioning system receiver which is generally indicated by the numeral 33. Still further, the location assembly 32 may further include a position locator that is generally indicated by the numeral 34. The position locator estimates the location of a communications device such as the cellular telephone or two-way radio 16a and 16b by triangulating the radio frequency emission sent by the communications device relative to nearby radio frequency detection assemblies 10 as deployed in the overlapping RF detection areas 21 which are shown in FIGS. 1 and 2, respectively.

The global positioning system receiver 33 and position locator 34 are electrically coupled to and controlled by the central processing unit 24. Still referring to FIG. 3, it will be seen that the present invention 10 includes a third radio frequency transceiver 35 which is electrically coupled with the central processing unit 24 by means of a control facility connection device 36, and which transmits an RF message to the control facility 17 to notify the control facility 17 of the presence of a communications device such as a cellular telephone 16a or two-way radio 16b within the restricted geographical region 11. In response to receiving such a radio frequency message from the third transceiver, the control facility 17 transmits an RF message to the communications device such as a cellular telephone or two-way radio 16a and 16b to warn a user of the communications device that the user is in a restricted geographical region. The communication which is made with the control facility 17 by way of the control facility connection device 36 may be encrypted in order to provide additional security for such a device 10. As should be understood, the message sent by the control facility 17 to the cellular telephone or two-way radio 16a and 16b may be an audible message, or it may comprise text message, or it may be both. After transmitting the message, if the trespasser does not leave the restricted or sensitive geographical area 11, the control facility 17 may dispatch personnel to the restricted geographical region to remove a user of the communications device such as the cellular telephone 16a or two-way radio 16b to stop the continuing trespass.

OPERATION

The operation of the described embodiment of the present invention is believed to be readily apparent and is briefly summarized at this point.

In its broadest aspect the present invention relates to a radio frequency detection assembly 10 which includes a radio frequency detector 23 which detects a radio frequency emission produced by a radio frequency emitter such as a cellular telephone 16a or two-way radio 16b from a given location which is remote relative to the radio frequency detector 23. The radio frequency detection assembly 10 further includes a location assembly 32 which is electrically coupled with the radio frequency detector 23, and which is operable to estimate the location of the radio frequency emitter 16a or 16b from the radio frequency emission which has been received. Still further, the invention 10 includes a radio frequency transmitter 35 coupled with the radio frequency detector 23, and the location assembly 32, and which transmits a radio frequency signal which reports the presence of the radio frequency emitter such as a cellular telephone 16a or two-way radio 16b.

In the arrangement as seen in FIG. 3, the radio frequency detector 23 may further comprise first transceiver 22 which is operable to both receive the radio frequency emission produced by the radio frequency emitter, such as the cellular telephone or two-way radio 16a, and 16b, and which is further operable to transmit a radio frequency signal. Still further, the present invention 10 includes a second transceiver 30 which is electrically coupled with the first transceiver 22, and which generates a radio frequency signal. In the arrangement as seen in FIG. 2, a plurality of radio detection assemblies 10 are located in a given geographical area 11, and are deployed in spaced relation throughout the given geographical region 11, and the second transceiver sends a radio frequency signal to another radio detection assembly 10, or receives the radio frequency signal generated by the second transceiver of another radio detection assembly 10. Still further, the present invention 10 includes a third transceiver 35, and a central processing unit 24 which is disposed in controlling relation relative to the first, second and third transceivers 22, 30 and 35, respectively. Still further, the present invention includes a control facility 17 (FIG. 1) located remotely relative to the radio frequency detection assembly 10, and which receives the radio frequency signal transmitted by the third transceiver 35, and which reports the presence of the radio frequency emitter such as the cellular telephone 16a or two-way radio 16b within the restricted or sensitive geographical area 11.

The present invention, as earlier described, includes an electrical power supply 25 and which may be selected from the group comprising charge storage devices; wind generators; solar panels; or a continuous source of electricity. The present invention also includes a location assembly 32 which may comprise a global positioning device 33, or a position locator 34 which may be rendered operable to estimate the location of the radio frequency emitter such as the cellular telephone 16a or two-way radio 16b by triangulating the radio frequency emissions sent by the emitter relative to nearby radio frequency detection assemblies 10. As earlier described, the control facility 17 is operable to send a radio signal which may comprise an audible, text message, or both, to the radio frequency emitter such as the cellular telephone or two-way radio 16a and 16b to alert the user thereof that they are in a restricted or sensitive geographical region 11.

The present invention includes a method for detecting radio frequencies which broadly includes the steps of deploying a radio frequency detector 23 in a given geographical region 11; detecting an emitted radio frequency produced by a communication device such as a cellular telephone 16a or two-way radio 16b within the given geographical region 11 by means of the radio frequency detector 23; and reporting the presence of the communication device 16a or 16b within the geographical region to a control facility 17. In the methodology as described, and after the step of detecting the emitted radio frequency produced by the communication device 16a or 16b, the method includes the step of estimating the location of communication device within the geographical region 11. Still further, the present method includes, after the step of reporting the presence of a communications device within the geographical region, communicating with the communications device 16a or 16b from the control facility 17 to advise a user of the communications device of their presence within the geographical region 11. This step of communicating with the communications device may include another step of transmitting an audio, text message, or both to the cellular telephone, or a two way radio to advise the user of the device to leave the geographical area. Still further, the present methodology may include after the step of reporting the presence of the communication device within the restricted region, and a further step of dispatching personnel to the restricted region to remove a user of the communications device 16a or 16b from the restricted region.

Therefore, the methodology of the present invention for detecting radio frequencies includes the steps of deploying a radio frequency detector 23 within a given restricted geographical region 11; and providing a control facility 17 which has responsibility for securing the given restricted geographical region 11. The method includes a further step of detecting an emitted radio frequency produced by a cellular telephone 16a or a two-way radio 16b within the restricted geographical region 11; and determining the geographic location of the cellular telephone or two way radio within the restricted geographical region 11 based, at least in part, upon the emitted radio frequency of the cellular telephone or two-way radio. Still further, the methodology includes another step of reporting the geographical location of the cellular telephone 16a or two-way radio 16b within the restricted geographical region 11 to the control facility 17; and communicating with the cellular telephone or two-way radio in a fashion so as to advise a user of the cellular telephone or two-way radio of their location within the restricted geographical region. As earlier discussed, the step of deploying the radio frequency detection assembly 10 comprises deploying a plurality of radio frequency detection assemblies in spaced relation within the restricted geographical region 11. As noted earlier, and in the methodology of the present invention, the method includes another step of determining the geographical location of the radio frequency detector which is detecting the emitted radio frequency being produced by the cellular telephone or two-way radio. This may be achieved by utilizing the GPS device 33 which is provided with the present invention 10. Still further, the step of determining the geographical location of the cellular telephone 16a or two-way radio 16b further comprises triangulating the location of the emitted radio frequency produced by the cellular telephone from at least two radio frequency detectors 23 by utilizing the position locator 34. The method of the present invention also includes a step of providing a renewable energy source for energizing the radio frequency detection assembly 10; and further enclosing the radio frequency detection assembly and its components within a weatherproof enclosure 20. The present methodology may also include another step of providing a substantially continuous energy source for energizing the radio frequency detector 23.

Therefore, it will be seen that the present invention provides a convenient means whereby the remote boundaries of a restricted region, and which may be intentionally or inadvertently crossed by an individual may be monitored, and a means is provided by which a control facility can communicate with a trespasser who is carrying a cellular telephone, or two-way radio 16a and 16b in a fashion where they can be advised that they have crossed into a restricted region and can be promptly instructed to leave the region.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A radio frequency detection assembly, comprising:
   a radio frequency detector which detects a radio frequency emission produced by a radio frequency emitter from a given location which is remote relative to the radio frequency detector, and wherein the radio frequency detector comprises a first transceiver which is operable to both receive the radio frequency emission produced by the radio frequency emitter and transmit a radio frequency signal;
   a second transceiver which is electrically coupled with the first transceiver, and which generates a radio frequency signal, and wherein a plurality of radio detection assemblies are located in a given geographical region and are deployed in spaced relation throughout the given geographical region, and wherein the second transceiver sends a radio frequency signal to another radio detection assembly, or receives the radio frequency signal generated by the second transceiver of another radio detection assembly;
   a location assembly electrically coupled with the radio frequency detector and which is operable to estimate the location of the radio frequency emitter from the radio frequency emission which has been received; and
   a radio frequency transmitter electrically coupled with the radio frequency detector and the location assembly, and which transmits a radio frequency signal which reports the presence of the radio frequency emitter.

2. A radio frequency detection assembly as claimed in claim 1, and wherein the radio frequency transmitter comprises a third transceiver, and wherein the radio frequency detection assembly further comprises:
   a central processing unit which is electrically coupled with, and disposed in controlling relation relative to, each of the first, second and third transceivers; and
   a control facility located remotely relative to the radio frequency detection assembly and which receives the radio frequency signal transmitted by the third transceiver and which reports the presence of the radio frequency emitter.

3. A radio frequency detection assembly as claimed in claim 1, and further comprising:
   an electrical power supply coupled to the radio frequency detection assembly and which energizes same.

4. A radio frequency detection assembly as claimed in claim 3, and wherein the electrical power supply is selected from the group comprising a charge storage device; wind generator; solar panel; or a continuous source of electricity.

5. A radio frequency detection assembly as claimed in claim 1, and wherein the location assembly comprises a global positioning device.

6. A radio frequency detection assembly as claimed in claim 1, and wherein the location assembly comprises a position locator, and wherein a plurality of radio frequency detection assemblies are located in a given geographical region, and wherein the position locator estimates the location of the radio frequency emitter by triangulating the radio frequency emission sent by the radio frequency emitter relative to nearby radio frequency detection assemblies.

7. A radio frequency detection assembly as claimed in claim 1, and further comprising:
   a control facility located remotely relative to the radio frequency detection assembly and which receives the radio frequency signal transmitted by the radio frequency transmitter, and wherein the control facility sends a radio signal message to the radio frequency emitter.

8. A radio frequency detection assembly as claimed in claim 7, and wherein the radio frequency emitter comprises a cellular telephone or a two-way radio.

9. A radio frequency detection assembly as claimed in claim 8, and wherein the radio signal message sent to the cellular telephone or two way radio is an audible message.

10. A radio frequency detection assembly as claimed in claim 8, and wherein the radio signal message sent to the cellular telephone comprises a text message.

11. A radio frequency detection assembly as claims in claims 1, and which is lightweight and weatherproof and which further can be deployed in a given geographical area by hand; thrown from an overland vehicle, and/or dropped from an aircraft.

12. A radio frequency detection assembly, comprising:
a first radio frequency transceiver which detects a radio frequency emission produced by a communications device from a given restricted geographical region which is remote relative thereto;
a central processing unit electrically coupled with the first radio frequency transceiver, and which controls the operation of the radio frequency detection assembly;
second radio frequency transceiver which is electrically coupled with the central processing unit and which communicates with another radio frequency detection assembly which is deployed near the given restricted geographical region;
a control facility which is positioned remotely relative to the radio frequency detection assembly and which can communicate with the communications device which is located within the given restricted geographical region;
a location assembly electrically coupled with the central processing unit and which estimates the location of the communications device within the given restricted geographic region from the radio frequency emission produced by the communications device; and
a third radio frequency transceiver which is electrically coupled with the central processing unit and which transmits a message to the control facility to notify the control facility of the presence of the communications device within the restricted geographical region, and wherein the control facility transmits a message to the communications device to warn a user of the communications device that the user is in a restricted geographical region.

13. A radio frequency detection assembly as claimed in claim 12, and wherein the location assembly comprises a global positioning device.

14. A radio frequency detection assembly as claimed in claim 12, and wherein the location assembly comprises a position locator, and wherein a plurality of radio frequency detection assemblies are located in the given restricted geographical region, and wherein the position locator estimates the location of the communication device by triangulating the radio frequency emission sent by the communication device relative to nearby radio frequency detection assemblies.

15. A radio frequency detection assembly as claimed in claim.12, and further comprising:
an electrical power supply which energizes the radio frequency detection assembly.

16. A radio frequency detection assembly as claimed in claim 15, and wherein the electrical power supply is a charge storage device.

17. A radio frequency detection assembly as claims in claims 15, and wherein the electrical power supply comprises a substantially continuous source of power.

18. A radio frequency detection assembly as claimed in claim 12, and wherein the communications device comprises a cellular telephone or a two-way radio.

19. A radio frequency detection assembly as claimed in claim 18, wherein the message sent by the control facility to the cellular telephone or two way radio is an audible message.

20. A radio frequency detection assembly as claimed in claim 18, and wherein the message sent to the cellular telephone comprises a text message.

21. A radio frequency detection assembly as claimed in claim 12, and which is lightweight and weatherproof and which further can be deployed in the given restricted geographical region by hand; thrown from an overland vehicle, and/or dropped from an aircraft.

22. A method for detecting radio frequencies, comprising:
deploying a radio frequency detector within a given restricted geographical region;
providing a control facility which has responsibility for securing the given restricted geographical region;
detecting an emitted radio frequency produced by a cellular telephone or a two-way radio within the restricted geographical region;
determining the geographic location of the cellular telephone or two way radio within the restricted geographical region based, at least in part, upon the emitted radio frequency of the cellular telephone or two-way radio;
reporting the geographical location of the cellular telephone or two-way radio within the restricted geographical region to the control facility; and
communicating with the cellular telephone or two-way radio in a fashion so as to advise a user of the cellular telephone or two-way radio of their location within the restricted geographical region.

23. A method as claimed in claim 22, and wherein the step of deploying the radio frequency detector comprises deploying a plurality of radio frequency detectors in spaced relation within the restricted geographical region.

24. A method as claimed in claim 23, and wherein the step of determining the geographical location of the cellular telephone or two-way radio further comprises:
determining the geographical location of the radio frequency detector which is detecting the emitted radio frequency being produced by the cellular telephone or two-way radio.

25. A method as claimed in claim 23, and wherein the step of determining the geographical location of the cellular telephone or two-way radio further comprises:
triangulating the location of the emitted radio frequency produced by the cellular telephone from at least two radio frequency detectors.

26. A method as claimed in claim 22, and further comprising:
providing a rechargeable energy source for energizing the radio frequency detector.

27. A method as claimed in claim 22, and further comprising:
providing a substantially continuous energy source for energizing the radio frequency detector.

28. A method as claimed in claim 22, and wherein the step of deploying the radio frequency detector within the given restricted geographical region further comprises:
enclosing the radio frequency detector within a weatherproof enclosure.

29. A method as claimed in claim 22, and further comprising:
dispatching personnel to the restricted geographical region to remove the user of the cellular telephone or two-way radio from the restricted geographical region.

\* \* \* \* \*